(12) United States Patent
Choi et al.

(10) Patent No.: US 12,212,852 B2
(45) Date of Patent: *Jan. 28, 2025

(54) FOCUSING APPARATUS AND METHOD

(71) Applicant: HANWHA VISION CO., LTD., Seongnam-si (KR)

(72) Inventors: Sung Wook Choi, Seongnam-si (KR); Won Mo Koo, Seongnam-si (KR); Jung Won Pac, Seongnam-si (KR); Joo Hye Noh, Seongnam-si (KR); Joo Hyun Yoon, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,296

(22) Filed: Dec. 12, 2023

(65) Prior Publication Data

US 2024/0129635 A1 Apr. 18, 2024

Related U.S. Application Data

(63) Continuation of application No. 17/496,063, filed on Oct. 7, 2021, now Pat. No. 11,882,364.

(30) Foreign Application Priority Data

May 20, 2021 (KR) .................. 10-2021-0064628

(51) Int. Cl.
*H04N 23/00* (2023.01)
*H04N 23/667* (2023.01)
*H04N 23/67* (2023.01)
*H04N 23/69* (2023.01)
*H04N 23/695* (2023.01)

(52) U.S. Cl.
CPC ......... *H04N 23/695* (2023.01); *H04N 23/667* (2023.01); *H04N 23/67* (2023.01); *H04N 23/69* (2023.01)

(58) Field of Classification Search
CPC .......... H04N 23/00; G03B 3/00; G03B 13/00
See application file for complete search history.

(56) References Cited

U.S. PATENT DOCUMENTS

| 2010/0013917 A1* | 1/2010 | Hanna ............. G08B 13/19689 348/E13.001 |
| 2012/0307042 A1* | 12/2012 | Lee ..................... H04N 23/635 348/114 |
| 2020/0099896 A1* | 3/2020 | Galvin ................. G01D 3/022 |

* cited by examiner

*Primary Examiner* — Maryam A Nasri
(74) *Attorney, Agent, or Firm* — McLean IP Global; Jason Y. Pahng

(57) ABSTRACT

A focusing method of a camera for obtaining an image of a surveillance area by performing a pan-tilt-zoom (PTZ) operation is included. The focusing method includes: determining whether a region of interest set in the surveillance area is included in a first image obtained by the camera; converting a mode according to a result of the determination by selecting a first mode in which focusing is performed using a first focusing algorithm or a second mode in which focusing is performed using a second focusing algorithm that is different from the first focusing algorithm; and focusing the camera with respect to the first image according to the first mode or the second mode.

16 Claims, 7 Drawing Sheets

FOCUSING APPARATUS AND METHOD

CROSS-REFERENCE TO RELATED APPLICATION

This application is a continuation of U.S. application Ser. No. 17/496,063 filed on Oct. 7, 2021. In addition, this application claims priority under 35 U.S.C. § 119 to Korean Patent Application No. 10-2021-0064628, filed on May 20, 2021, in the Korean Intellectual Property Office, the disclosure of which is incorporated by reference herein in its entirety.

BACKGROUND

1. Field

One or more embodiments relate to a focusing apparatus and method.

2. Description of the Related Art

A focus of a camera changes according to the distance from an object, and to capture high-quality images, there is an autofocus (AF) function for adjusting a focus automatically according to the change of the distance from the object.

The AF function involves moving a position of the lens to the front or back to adjust the focus to make a blur, out-of-focus image into a sharp image so that the most sharp image of the object is formed on the image sensor.

SUMMARY

One or more embodiments include a focusing apparatus and method for a camera that performs a pan-tilt-zoom (PTZ) operation and also accurately and quickly performs focusing regardless of the environment.

Additional aspects will be set forth in part in the description which follows and, in part, will be apparent from the description, or may be learned by practice of the presented embodiments of the disclosure.

According to one or more embodiments, a focusing method of a camera for obtaining an image of a surveillance area by performing a pan-tilt-zoom (PTZ) operation includes: determining whether a region of interest set in the surveillance area is included in a first image obtained by the camera; converting a mode according to a result of the determination by selecting a first mode in which focusing is performed using a first focusing algorithm or a second mode in which focusing is performed using a second focusing algorithm that is different from the first focusing algorithm; and focusing the camera with respect to the first image according to the first mode or the second mode.

The first focusing algorithm may include an algorithm in which focusing is performed by automatically setting a focus area and moving the focus lens step-by-step such that the focus area is focused, and the second focusing algorithm includes an algorithm in which focusing is performed by setting the region of interest as the focus area and moving the focus lens to a preset position of the focus lens for the region of interest.

The determination of whether the region of interest is included in the first image may include calculating the ratio of a portion in the first image, the portion corresponding to a second image which is a previously stored image of the region of interest, and the converting of the mode may include converting the mode by selecting the first mode or the second mode according to the ratio.

The conversion of the mode may include converting the mode from the first mode to the second mode when the ratio is equal to or higher than a threshold ratio.

The focusing in the second mode may include calculating a position of a focus lens set at a zoom magnification of the camera before the conversion of the mode, based on a relationship between a zoom magnification predefined with respect to the region of interest and a position of the focus lens, and moving the focus lens to the calculated position of the focus lens.

The determination of whether the region of interest is included in the first image may include determining whether a pan value and a tilt value of the camera corresponding to the first image are in a preset range of pan values and a preset range of tilt values including a reference pan value and a reference tilt value of the camera corresponding to a second image, which is a previously stored image of the region of interest, and the converting of the mode may include converting the mode from the first mode to the second mode when the pan value and the tilt value of the camera are in the range of pan values and the range of tilt values.

The focusing in the second mode may include calculating a position of a focus lens set at a zoom magnification of the camera before the conversion of the mode, based on a relationship between a zoom magnification predefined with respect to the region of interest and a position of the focus lens, and moving the focus lens to the calculated position of the focus lens.

The focusing may further include: calculating, in the second mode, a temperature difference between a current internal temperature of the camera and an internal temperature of the camera at the time when generating the second image; and calculating a position correction value of a focus lens corresponding to the temperature difference, from a relationship between a predefined temperature variation and a variation in a position of the focus lens, and correcting the position of the focus lens by the calculated position correction value.

The focusing may further include correcting a position of the focus lens according to a preset infrared light correction value while an infrared illumination installed in the surroundings of the camera is operating.

According to one or more embodiments, a focusing apparatus includes: a determiner configured to determine whether a region of interest set in a surveillance area is included in a first image obtained in the surveillance area by a camera performing a pan-tilt-zoom (PTZ) operation; a mode selector configured to convert a mode according to a result of the determination by selecting a first mode in which focusing is performed using a first focusing algorithm or a second mode in which focusing is performed using a second focusing algorithm that is different from the first focusing algorithm; and a focusing unit configured to focus the camera with respect to the first image according to the first mode or the second mode.

The first focusing algorithm may include an algorithm in which focusing is performed by automatically setting a focus area and moving a focus lens step-by-step such that the focus area is focused, and the second focusing algorithm may include an algorithm in which focusing is performed by setting the region of interest as the focus area and moving the focus lens to a preset position of the focus lens for the region of interest.

The determiner may calculate the ratio of a portion in the first image, the portion corresponding to a second image which is a previously stored image of the region of interest, and the mode selector may convert the mode by selecting the first mode or the second mode according to the ratio. The mode selector may convert the mode from the first mode to the second mode when the ratio is equal to or higher than a threshold ratio.

In the second mode, the focusing unit may calculate a position of a focus lens set at a zoom magnification of the camera before the mode is converted, based on a relationship between a zoom magnification predefined with respect to the region of interest and a position of the focus lens, and output a control signal for moving the focus lens to the calculated position of the focus lens.

The determiner may determine whether a pan value and a tilt value of the camera corresponding to the first image are in a preset range of pan values and a preset range of tilt values including a reference pan value and a reference tilt value of the camera corresponding to a second image, which is a previously stored image of the region of interest, and the mode selector may convert the mode from the first mode to the second mode when the pan value and the tilt value of the camera are in the range of pan values and the range of tilt values.

In the second mode, the focusing unit may calculate a position of a focus lens set at a zoom magnification of the camera before the conversion of the mode, based on a relationship between a zoom magnification predefined with respect to the region of interest and a position of the focus lens, and moves the focus lens to the calculated position of the focus lens.

In the second mode, the focusing unit may calculate a temperature difference between a current internal temperature of the camera and an internal temperature of the camera at the time when generating the second image, calculate a position correction value of the focus lens corresponding to the temperature difference, from a relationship between a predefined temperature variation and a variation in the position of the focus lens, and output a control signal for correcting the position of the focus lens by the calculated position correction value.

The focusing unit may output a control signal for correcting a position of the focus lens according to a preset infrared light correction value while an infrared illumination installed in the surroundings of the camera is operating.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
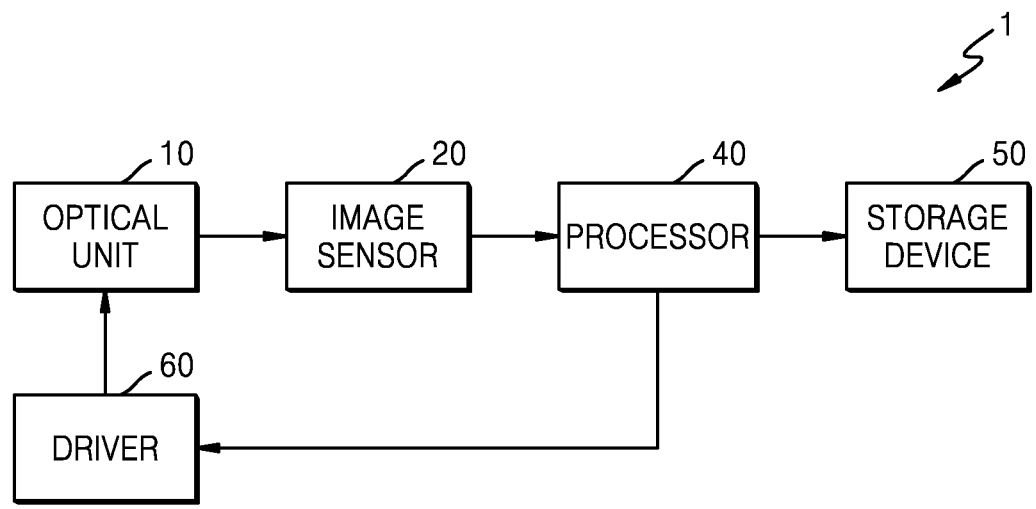
FIG. 1 is a schematic block diagram of a camera according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The following description exemplifies only the principles of the present disclosure. Even if they are not described or illustrated clearly in the present specification, those of ordinary skill in the art can embody the principles of the present disclosure and invent various apparatuses within the concept and scope of the present disclosure. The use of the conditional terms and embodiments presented in the present specification are intended only to make the concept of the present disclosure understood, and they are not limited to the embodiments and conditions mentioned in the specification. In addition, all the detailed description on the principles, viewpoints and embodiments and particular embodiments of the present disclosure should be understood to include structural and functional equivalents to them. The equivalents include not only currently known equivalents but also those to be developed in future, that is, all devices invented to perform the same function, regardless of their structures.

Therefore, functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared. The apparent use of a term, 'processor', 'control' or similar concept, should not be understood to exclusively refer to a piece of hardware capable of running software, but should be understood to include a digital signal processor (DSP), hardware, and ROM, RAM, and non-volatile memory for storing software, implicatively. Other known and commonly used hardware may be included therein, too.

The foregoing objects, features, and advantages will be more apparent from the following detailed description made with reference to the accompanying drawings. In the description of the present disclosure, the detailed description of known techniques which might unnecessarily obscure the object matter of the present disclosure will be omitted or made in brief.

When a part "includes" an element, it means that the part does not include elements other than the mentioned element but may include other elements provided that there is no special indication to the contrary.

Hereinafter, an exemplary embodiment of the present disclosure will be described in detail with reference to the accompanying drawings.

Hereinafter, an exemplary embodiment of the present disclosure will be described in detail with reference to the accompanying drawings. Also, in the description and the drawings of the present disclosure, elements having substantially identical structures will be labeled with identical reference numerals to omit repeated description.

FIG. 1 is a schematic block diagram of a camera according to an embodiment of the present disclosure.

A camera 1 may include a pan/tilt/zoom (PTZ) camera that is arranged at a fixed position of a particular place and has a PTZ function. The camera 1 may include a surveillance camera including a visual camera, a thermal camera, a special-purpose camera, or the like. The camera 1 may be installed not only in offices, homes, hospitals, but also inside and outside public buildings or outdoors such as parks, where security is required, and may have various shapes such as a straight shape or a dome shape.

The camera 1 may obtain an image by capturing an allocated surveillance area. The camera 1 may obtain images of a surveillance area by dividing the surveillance area into multiple regions and capturing an image of each region by modifying a posture of the camera by using a preset method. The camera 1 may obtain images of a surveillance area by performing panning and/or tilting by using a driving device and adjusting a zoom magnification by zooming in or zooming out a zoom lens. A direction of the camera 1 may be indicated by a panning angle and a tilting angle of the camera 1, and an angle of view or a field of view of the camera 1 may be indicated by a zoom magnification.

Referring to FIG. 1, the camera 1 according to the embodiment may include an optical unit 10, an image sensor 20, a processor 40, a storage device 50, and a driver 60.

The optical unit 10 may optically process light from an object and may include a plurality of lenses such as a zoom lens, a focus lens, or the like.

The image sensor 20 may be implemented using a complementary metal oxide semiconductor (CMOS) image sensor or a charge-coupled device (CCD) image sensor, and may convert an optical signal input through the optical unit 10 into an electrical signal.

The processor 40 may convert an electrical signal from the image sensor 20 into an image signal. The processor 40 may perform various signal processing for improving image quality, such as color processing or sharpness processing, on a signal output from the image sensor 20. The processor 40 may analyze an image signal and generate various control signals based on a result of the analyzing.

The processor 40 may generate a control signal for focusing of the camera 1 and output the control signal to the driver 60. The processor 40 may generate a control signal for direction control of the camera 1 and output the control signal to the driver 60. The processor 40 may generate a control signal for zoom magnification control of the camera 1 and output the control signal to the driver 60.

The processor 40 may be implemented using various numbers of hardware or/and software components performing certain functions. For example, the processor 40 may refer to a data processing device that is embedded in a hardware component and has a physically structured circuit to perform a function expressed as code or commands in a program. Examples of the data processing device embedded in a hardware component may encompass a microprocessor, a central processing unit (CPU), a processor core, a multi-processor, an application-specific integrated circuit (ASIC), a field programmable gate array (FPGA), and the like, but the present disclosure is not limited thereto. According to an embodiment, the processor 40 may be implemented using an image signal processor (ISP) and/or a digital signal processor (DSP).

The storage device 50 may include random access memory (RAM), read-only memory (ROM), and a combination thereof. The storage device 50 may include a large-capacity storage device including a hard disk drive, an optical disk drive, a solid-state drive (SSD). The storage device 50 may be embedded in the camera 1 or mounted therein.

The storage device 50 may previously store information about a relationship between a position of a focus lens and a zoom magnification according to each distance between the camera 1 and an object. The storage device 50 may previously store information about a relationship between a temperature variation of a camera and a positional variation of a focus lens. The storage device 50 may previously store a correction value of a position of a focus lens with respect to an infrared light source.

The driver 60 may include a zoom motor and a focus motor moving a zoom lens and a focus lens, a pan motor and a tilt motor for panning and tilting of the optical unit 10, and a motor driver driving these motors.

The driver 60 may move a position of the focus lens by controlling a focus motor according to a control signal for focusing, the control signal being output from the processor 40. The driver 60 may control a direction of the optical unit 10 by controlling the pan motor and/or the tilt motor according to a control signal for direction control, the control signal being output from the processor 40. The driver 60 may move a position of the zoom lens according to a control signal for zoom magnification control, the control signal being output from the processor 40.

Hereinafter, description will focus on focusing of the camera 1.

Figure 2:
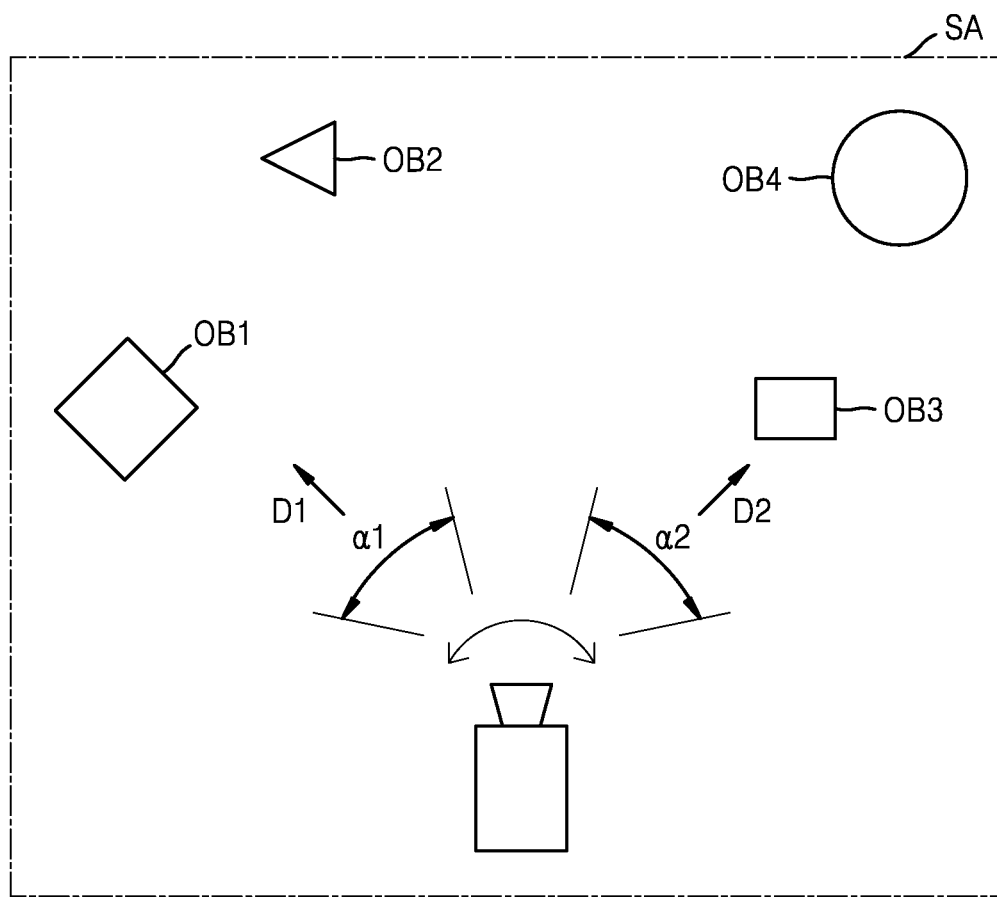
FIG. 2 is a diagram illustrating a camera monitoring a surveillance area, according to an embodiment.

FIG. 2 is a diagram illustrating a camera monitoring a surveillance area, according to an embodiment.

Referring to FIG. 2, the camera 1 may obtain an image of a surveillance area SA by performing a PTZ operation. For example, the camera 1 may obtain an image at a first angle of view α1 in a first direction D1 and an image at a second angle of view α2 in a second direction D2. The camera 1 may perform focusing with respect to a region of the surveillance area SA. For example, the camera 1 may perform focusing with respect to at least one of a plurality of objects OB1 through OB4 of the surveillance area SA, wherein the objects are respectively apart from the camera 1 in certain directions and by certain distances. The plurality of objects OB1 through OB4 may be still or moving objects. The plurality of objects OB1 through OB4 may be a region of a background or a foreground. Hereinafter, an object or a region used as a reference for focusing will be referred to as the focus area. The camera 1 may perform focusing in a first mode or a second mode when obtaining an image from each direction. A focusing mode will be described later.

Figure 3:
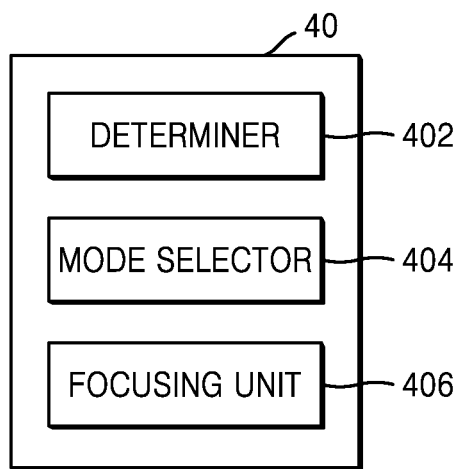
FIG. 3 is a schematic structural diagram of a processor according to an embodiment.
Figure 4:
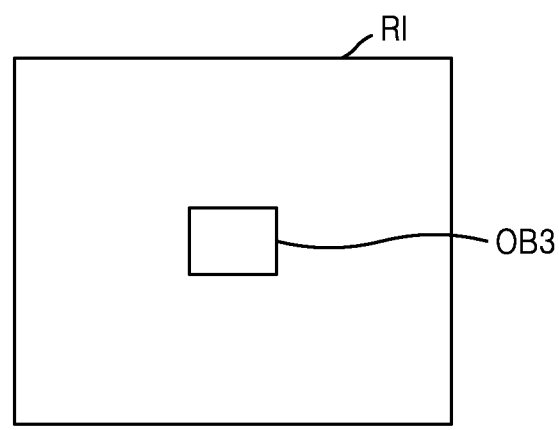
FIG. 4 is a diagram illustrating a reference image according to an embodiment.
Figure 5A:
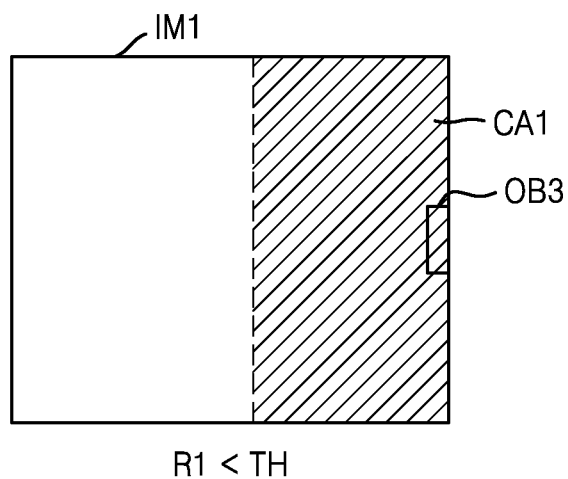
FIGS. 5A and 5B are diagrams for describing calculation of the ratio of a reference image in a surveillance image according to an embodiment.
Figure 5B:
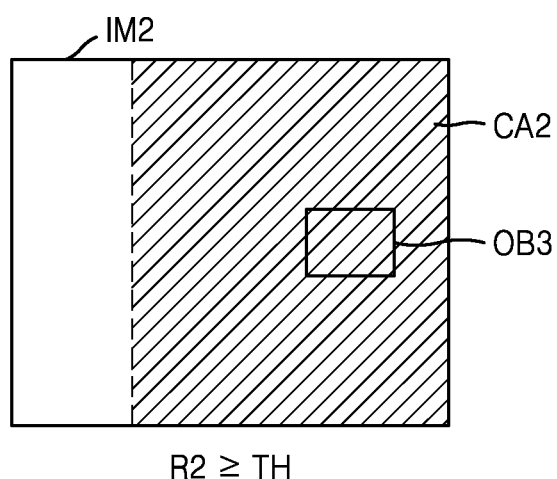
Figure 6:
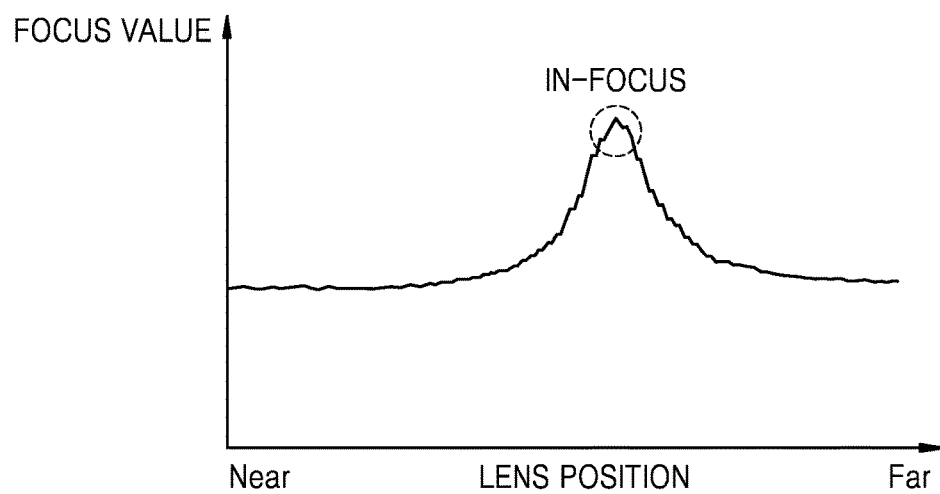
FIG. 6 is a diagram for describing a first focusing algorithm according to an embodiment.
Figure 7:
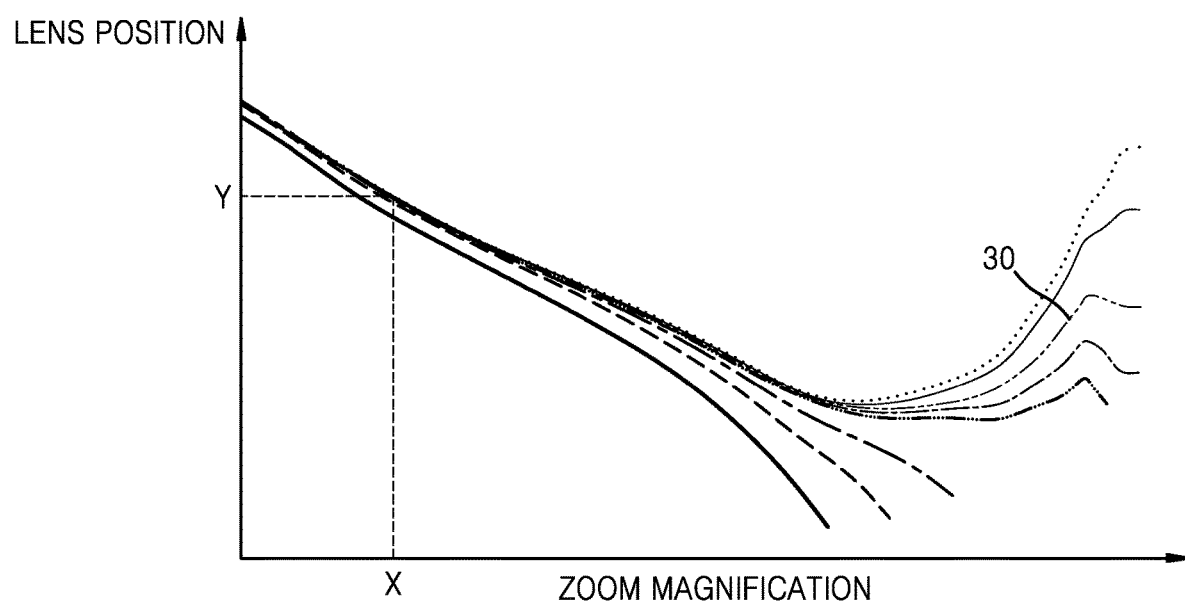
FIG. 7 is a diagram for describing a second focusing algorithm according to an embodiment.
Figure 8:
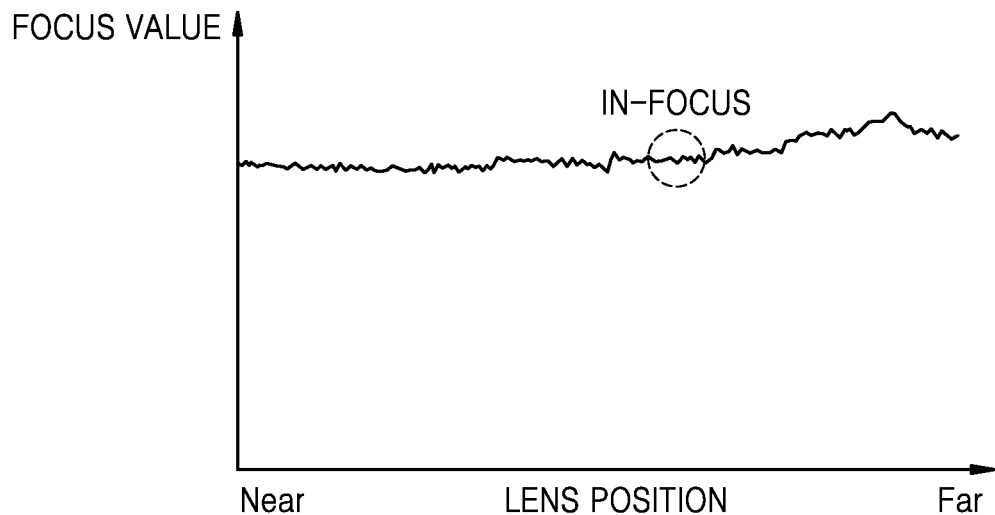
FIG. 8 is a diagram for describing focusing according to a comparative example.

FIG. 3 is a schematic structural diagram of a focusing apparatus according to an embodiment. FIG. 4 is a diagram illustrating a reference image according to an embodiment. FIGS. 5A and 5B are diagrams for describing calculation of the ratio of a reference image in a surveillance image according to an embodiment. FIG. 6 is a diagram for describing a first focusing algorithm according to an embodiment. FIG. 7 is a diagram for describing a second focusing algorithm according to an embodiment. FIG. 8 is a diagram for describing focusing according to a comparative example.

The focusing apparatus of FIG. 3 may be implemented in the processor 40 of the camera 1. Referring to FIG. 3, the processor 40 may include a determiner 402, a mode selector 404, and a focusing unit 406.

The determiner 402 may determine whether a region of interest is included in a surveillance image (also referred to as a 'first image') obtained by the camera 1 from the surveillance area SA while performing a PTZ operation.

The mode selector 404 may convert a mode by selecting a first mode or a second mode as a focusing mode based on a result of the determination by the determiner 402. The first mode may be a mode in which focusing is performed according to a first focusing algorithm. The second mode may be a mode in which focusing is performed according to a second focusing algorithm. The first focusing algorithm and the second focusing algorithm may be different focusing algorithms from each other differing in a method of setting a focus area.

The first focusing algorithm may be an automatic focusing algorithm used in an autofocus function. The second focusing algorithm may be a focusing algorithm in which a region of interest is set as the focus area and the focus lens is moved to a preset focus lens position within a distance between the camera 1 and the region of interest.

According to an embodiment, the determiner 402 may determine whether a region of interest is included in a surveillance image by calculating the ratio of a portion corresponding to a reference image (also referred to as 'second image'), which is an image of the region of interest, in the surveillance image. The determiner 402 may compare the calculated ratio with a threshold ratio. The determiner 402 may output a result comparing the calculated ratio with the threshold ratio, to the mode selector 404.

The reference image may be an image obtained, by the camera 1, by setting a region of interest as the focus area in a surveillance area in advance while focusing is performed with respect to the region of interest and stored in the storage device 50. FIG. 4 illustrates a reference image RI obtained by setting a region of interest of a surveillance area, for example, an object OB3 or an area including the object OB3 as the focus area and performing focusing. The storage device 50 may also store, with the reference image RI, a position of the object OB3, that is, a distance between the camera 1 and the object OB3, a posture value of the camera 1 (a pan value/title value/zoom value) at the time when generating the reference image RI, and an internal temperature of the camera 1 at the time when generating the reference image RI. For example, as illustrated in FIG. 5A, the determiner 402 may calculate the ratio R1 of an area CA1 corresponding to the reference image RI in a first surveillance image IM1 obtained by the camera 1 in a certain direction and at a certain zoom magnification and the ratio R2 of an area CA2 corresponding to the reference image RI in a second surveillance image IM2 obtained by the camera 1 in a certain direction and at a certain zoom magnification. The determiner 402 may compare each of calculated ratios with a threshold ratio TH. According to an embodiment, the threshold ratio TH may be 50%. FIG. 5A illustrates an example which the ratio R1 of the area CA1 corresponding to the reference image RI in the first surveillance image IM1 is less than the threshold ratio TH, and FIG. 5B illustrates an example which the ratio R2 of the area CA2 corresponding to the reference image RI in the second surveillance image IM2 is equal to or greater than the threshold ratio TH.

The mode selector 404 may convert a mode by selecting the first mode or the second mode as a focusing mode according to the ratio of an area corresponding to a reference image in a surveillance image. When the ratio is less than a threshold ratio, the mode selector 404 may select the first mode, and when the ratio is equal to or greater than the threshold ratio, the mode selector 404 may select the second mode.

For example, while the camera 1 performs focusing in the first mode, when the calculated ratio is equal to or exceeds the threshold ratio, the mode selector 404 may select the second mode and the camera 1 may be converted from the first mode into the second mode to perform focusing. While the camera 1 performs focusing in the second mode, when the calculated ratio is less than the threshold ratio, the mode selector 404 may select the first mode and the camera 1 may be converted from the second mode into the first mode to perform focusing. While the calculated ratio is continuously less than the threshold ratio, the mode selector 404 may continuously select the first mode so that the camera 1 may perform focusing by maintaining the first mode. While the calculated ratio is continuously equal to or greater than the threshold ratio, the mode selector 404 may continuously select the second mode so that the camera 1 may perform focusing by maintaining the second mode.

According to another embodiment, the determiner 402 may determine whether a region of interest is included in a surveillance image by determining whether a pan value and a tilt value of the camera 1 corresponding to the surveillance image are respectively included in a preset range of pan values and a preset range of tilt values.

The preset range of pan values may be a range including a pan value of the camera 1 corresponding to the reference image RI (reference pan value). The preset range of tilt values may be a range including a tilt value of the camera 1 corresponding to the reference image RI (reference tilt value). For example, when obtaining the reference image RI, a pan value and a tilt value of the camera 1 may be respectively 98 degrees and 45 degrees, and when a zoom value is an angle of view of 4 degrees horizontally and 3 degrees vertically, a reference pan value and a reference tilt value are respectively 98 degrees and 45 degrees. A range of pan values may be from about 96 degrees to about 102 degrees, including the reference pan value 98 degrees, and a range of tilt values may be from about 43.5 degrees to about 46.5 degrees, including the reference tilt value 45 degrees.

The determiner 402 may determine whether a pan value and a tilt value of the camera 1 when obtaining a current surveillance image, are respectively within a range of pan values and a range of tilt values, and may output a result of the determination to the mode selector 404.

The mode selector 404 may convert a mode by selecting the first mode or the second mode as a focusing mode based on the pan value and the tilt value of the camera 1. When the pan value and the tilt value of the camera 1 are not included in the range of pan values and the range of tilt values, the mode selector 404 may select the first mode, and when they are included in the range of pan values and the range of tilt values, the mode selector 404 may select the second mode.

For example, while the camera 1 performs focusing in the first mode, when the pan value and the tilt value of the camera 1 are within the range of pan values and the range of tilt values, the mode selector 404 may select the second mode and the camera 1 may be converted from the first mode into the second mode to perform focusing. For example, while the camera 1 performs focusing in the second mode, when the pan value and the tilt value of the camera 1 are outside the range of pan values and the range of tilt values, the mode selector 404 may select the first mode and the camera 1 may be converted from the second mode to the first mode to perform focusing. While the pan value and the tilt value of the camera 1 are in the range of pan values and the range of tilt values, the mode selector 404 may perform focusing while continuously maintaining the second mode. In an embodiment in which a focusing mode is selected based on the ratio of a reference image in a surveillance image, when a zoom magnification of the surveillance image is equal to or less than a half of a zoom magnification of the reference image, the second mode is not selected. In an embodiment in which a focusing mode is selected based on pan-tilt coordinates of a surveillance image and pan-tilt coordinates of a reference image, conditions for selecting the second mode may be met regardless of a zoom magnification of the surveillance image, and thus, a region of interest may be focused quickly and accurately.

The focusing unit 406 may perform focusing of the camera 1 according to the selected focusing mode. The focusing unit 406 may perform focusing by using the first focusing algorithm in the first mode. The focusing unit 406 may perform focusing by using the second focusing algorithm in the second mode.

FIG. 6 is a diagram for describing focusing to which the first focusing algorithm is applied in the first mode. In FIG. 6, a value in a horizontal direction denotes a position of a focus lens (or a lens step which is a unit for moving the position of the focus lens), and a value in a vertical direction may be a focus value. The focus value may be defined, for example, as a value calculated through edge data output when an image signal passes through a high pass filter (HPF), and a position at which the focus value is the greatest may be an in-focus position. For example, among positions of each focus lens (or a lens step that is a unit used to move a position of a focus lens), a position of a focus lens (or a lens step) where a focus value obtained by converting a high-frequency image signal in numerical values is the greatest and where a most sharp image is obtained may be an in-focus position.

In an embodiment of the present disclosure, a method of calculating a focus value is not particularly limited, and various known methods may be used to calculate a focus value, for example, an astigmatism method, a double astigmatism method, a method of calculating a focus value of an image based on coefficients of a discrete cosine transform (DCT) of pixels, a phase difference detection method, and a contrast detection method. As the first focusing algorithm, a known auto-focus algorithm such as a hill climbing method may be used.

As illustrated in FIG. 6, in the first mode, the focusing unit 406 may automatically set a certain object in a surveillance area as a focus area, and may track a variation in a focus value by moving a position of a focus lens from near to far (infinite) to focus the focus area. The focus area may be modified in the first mode, and the focusing unit 406 may track a variation in the focus value while modifying the focus area. When the focus lens is moved in a direction from near to far, a focus value shows a tendency of increasing, and when the focus lens passes by an in-focus position, the focus value shows a tendency of decreasing. When the focus value tends to decrease, the focusing unit 406 may detect a position of the focus lens at which a focus value has a maximum value, by moving the focus lens again in a reverse direction. That is, in the first mode, the focusing unit 406 may move the focus lens in real time and compare previous and subsequent focus values and identify an increase or decrease in the focus value, an inclination of the focus value, a variation in the inclination of the focus value or the like to determine a peak point with a largest focus value as an in-focus position.

FIG. 7 is a diagram for describing focusing to which the second focusing algorithm is applied in the second mode. In FIG. 7, a value in a horizontal direction may denote a zoom magnification, and a value in a vertical direction may denote a position of a focus lens (or a lens step). FIG. 7 illustrates graphs showing a relationship between a position of a focus lens and a zoom magnification according to each distance between the camera 1 and an object (hereinafter referred to as 'focus position data'). For example, a graph 30 may denote a relationship between a position of a focus lens and a zoom magnification when a distance between the camera 1 and an object is 15 m.

In the second mode, the focusing unit 406 may focus a certain object (region of interest) set as a focus area in a reference image, and may quickly detect a position of the focus lens with respect to a previously used zoom magnification based on focus position data corresponding to a distance of the certain object, previously stored, without moving the focus lens step by step. The previously used zoom magnification may include a zoom magnification used in a focusing mode of an immediately preceding image.

Referring to FIGS. 4 through 5B, when the second surveillance image IM2 is obtained, the focusing unit 406 may detect a position of the focus lens corresponding to a zoom magnification corresponding to when obtaining the first surveillance image IM1 from focus position data corresponding to a distance of the object OB3 set as the focus area in the reference image RI. For example, when the distance of the object OB3 is 15 m, and a zoom magnification corresponding to when obtaining the first surveillance image IM1 is X, the focusing unit 406 may detect a position Y of the focus lens from the focus position data expressed by the graph 30 illustrated in FIG. 7.

The focus position data according to the embodiment of the present disclosure is not limited to the graph form as illustrated in FIG. 7, and may be established in advance in various forms such as a lookup table and stored in the storage device 50.

When there is no focus position data corresponding to a distance of an object, the focusing unit 406 may estimate focus position data with respect to the distance of the object by performing interpolation on focus position data of adjacent distances of objects.

The focusing unit 406 may generate a control signal for moving the focus lens to a position of the focus lens, the position being detected in the first mode or the second mode, and may output the control signal to the driver 60.

The auto-focusing algorithm used in the first mode may have inaccurate edge data as illustrated in FIG. 8, in a low-illuminance environment at night, in an environment with a considerable amount of movement, in an environment with a high contrast between the darkness and the brightness (counterlight), or the like, and thus, a normal position of the focus lens may not be found using the edge data. According to the embodiment of the present disclosure, as a camera performs focusing according to the second mode, on a region of interest of a user, an image of the region of interest, in which a certain object is focused regardless of a state of an environment, may be obtained.

Figure 9:
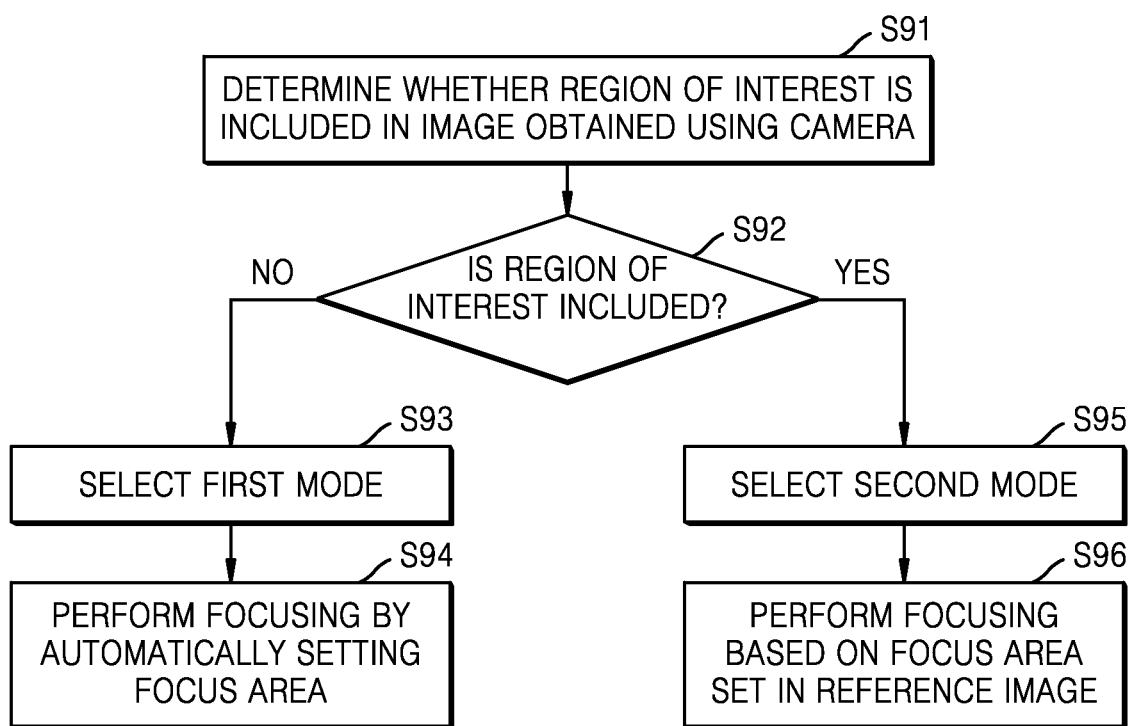
FIG. 9 is a schematic diagram for describing a focusing method of a camera, according to an embodiment.

FIG. 9 is a schematic diagram for describing a focusing method of a camera, according to an embodiment. FIG. 9 may be a focusing method performed by the processor 40 of the camera 1 of FIG. 1. Hereinafter, detailed description of those details provided above with reference to FIGS. 1 through 8 will be omitted. Referring to FIG. 9, the determiner 402 may determine whether a region of interest is included in a surveillance image obtained using the camera 1 (S91, S92).

The processor 40 may convert a focusing mode by selecting a first mode or a second mode as a focusing mode according to a result of the determination, and may perform focusing according to the converted focusing mode.

The mode selector 404 may select the first mode in which the first focusing algorithm is applied, in response to a result of the determination, the result indicating that a region of interest is not included in the surveillance image (S93). The first focusing algorithm may include an auto-focusing algorithm in which a focus area is automatically set and a focus is adjusted to focus the focus area.

The focusing unit 406 may adjust a focus by using the auto-focusing algorithm in response to the selection of the first mode (S94). The focusing unit 406 may detect a position of a focus lens at which a focus value has a maximum value, by moving the position of the focus lens between a near distance and a far distance such that the automatically set focus area is focused.

The mode selector 404 may select the second mode in which the second focusing algorithm is applied, in response to a result of the determination, the result indicating that a region of interest is included in the surveillance image (S95). The second focusing algorithm may include a focusing algorithm in which the region of interest is set as a focus area and the focus lens is moved to a preset position of the focus lens for the region of interest.

The focusing unit 406 may adjust a focus by detecting the position of the focus lens set for the region of interest, in response to the selection of the second mode (S96). The focusing unit 406 may detect the region of interest as the focus area and detect a position of the focus lens with respect to a certain zoom magnification based on previously stored focus position data of the region of interest. The certain zoom magnification may include a zoom magnification of a camera used in obtaining an immediately preceding surveillance image.

The focusing unit 406 may generate a control signal for moving the focus lens to a position of the focus lens, the position being detected in the first mode or the second mode, and may output the control signal to the driver 60.

According to an embodiment, the determiner 402 may determine whether a region of interest is included in a surveillance image by calculating the ratio of a portion corresponding to a reference image in the surveillance image obtained using the camera 1. The determiner 402 may compare the calculated ratio with a threshold ratio and output a comparison result. A reference image may be an image that is obtained in advance while a focus is adjusted by setting a certain object corresponding to a region of interest as a focus area. The reference image may be modified.

The mode selector 404 may select the first mode in which the first focusing algorithm is applied, in response to a result of the comparing, the result indicating that the calculated ratio is less than the threshold ratio. The focusing unit 406 may adjust a focus by using the auto-focusing algorithm in response to the selection of the first mode.

The mode selector 404 may select the second mode in which the second focusing algorithm is applied, in response to a result of the comparing, the result indicating that the calculated ratio is equal to or greater than the threshold ratio.

The focusing unit 406 may adjust a focus by detecting a position of the focus lens set in the focus area set in the reference image, in response to the selection of the second mode.

According to an embodiment, the determiner 402 may determine whether a region of interest is included in a surveillance image by determining whether a pan value and a tilt value of the camera 1 corresponding to the surveillance image obtained using the camera 1 are included in a preset range of pan values and a preset range of tilt values. The determiner 402 may determine whether a pan value and a tilt value of the camera 1 are respectively within the range of pan values and the range of tilt values, and may output a result of the determination.

When the pan value and the tilt value of the camera 1 are not included in the range of pan values and the range of tilt values, the mode selector 404 may select the first mode, and when included, the mode selector 404 may select the second mode.

The focusing unit 406 may adjust a focus by using the auto-focusing algorithm in response to the selection of the first mode. The focusing unit 406 may adjust a focus by detecting a position of the focus lens set in the focus area set in the reference image (that is, region of interest), in response to the selection of the second mode.

Figure 10:
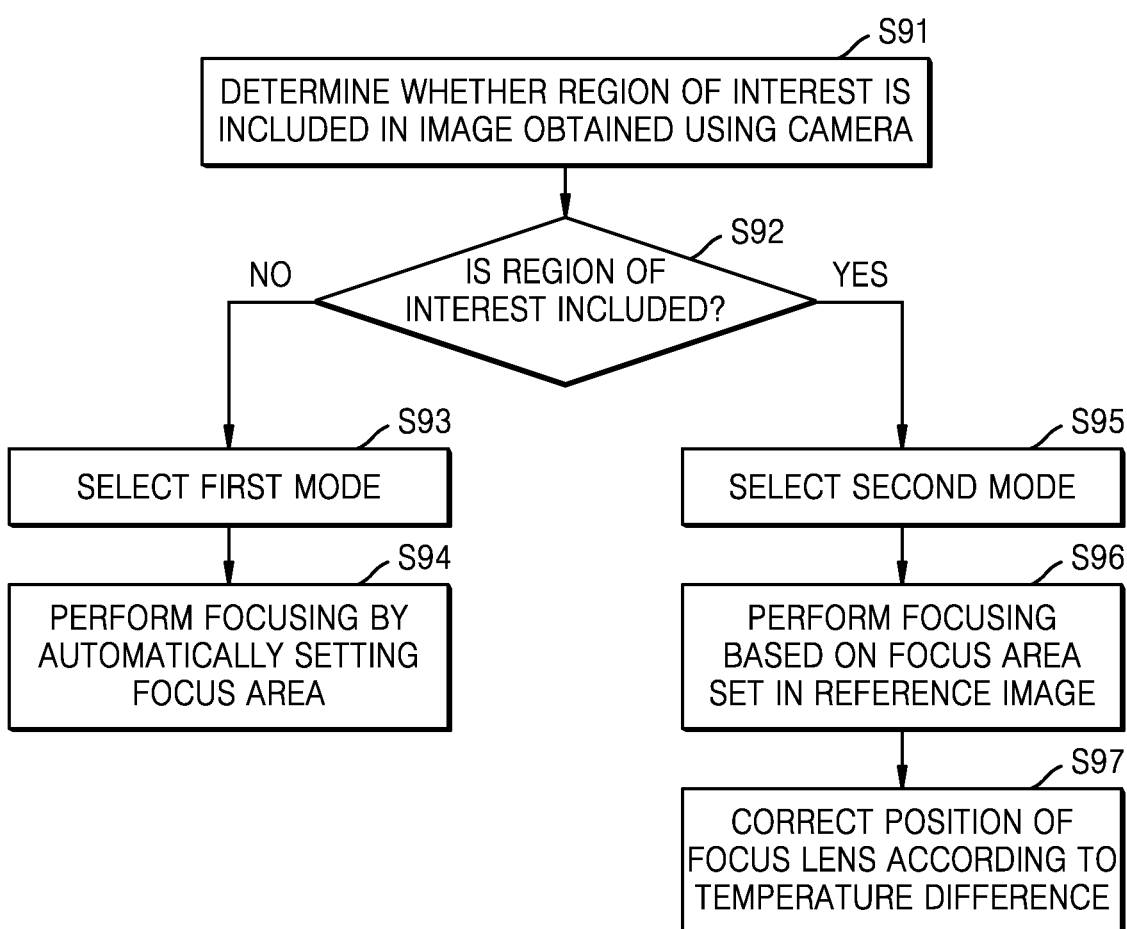
FIG. 10 is a schematic diagram for describing a focusing method of a camera, according to an embodiment.

FIG. 10 is a schematic diagram for describing a focusing method of a camera, according to an embodiment. The embodiment illustrated in FIG. 10 is different from that illustrated in FIG. 9 in that correction of a position of a focus lens considering temperature is further added in the second mode.

Due to a high resolution, lightweight, and downsizing of a camera, a focus is likely to change significantly even by a small movement of a lens. The change in the focus may result in sensitive changes in the focus due to contraction and expansion of a lens and a barrel according to temperature.

A first internal temperature of the camera at the time when generating a reference image may be different from a second internal temperature (current internal temperature) of the camera. Thus, there is a need to correct the position of the focus lens by reflecting a temperature difference between the first internal temperature and the second internal temperature.

As illustrated in FIG. 10, in the second mode, the focusing unit 406 may correct a position of the focus lens detected first based on the reference image by considering a temperature difference (S97).

The focusing unit 406 may calculate a temperature difference, which is a difference between the first internal temperature of the camera at the time when the reference image is generated and the second internal temperature of the current camera. A relationship between a temperature variation and a variation in a position of a focus lens, that is, a position correction value of a focus lens with respect to a temperature difference (hereinafter, 'first corrected data') may be previously established and stored in the storage device 50. The focusing unit 406 may detect a position correction value of the focus lens corresponding to a temperature difference calculated based on the first corrected data. When there is no temperature difference calculated, in the first corrected data, the focusing unit 406 may detect a position correction value of the focus lens corresponding to the calculated temperature difference by performing interpolation on position correction values of adjacent temperature differences. The focusing unit 406 may output a control signal for correcting a position of the focus lens by the position correction value.

According to the present embodiment, the camera may obtain an image on which an object wished by a user, is focused, even in an environment with great temperature changes.

Figure 11:
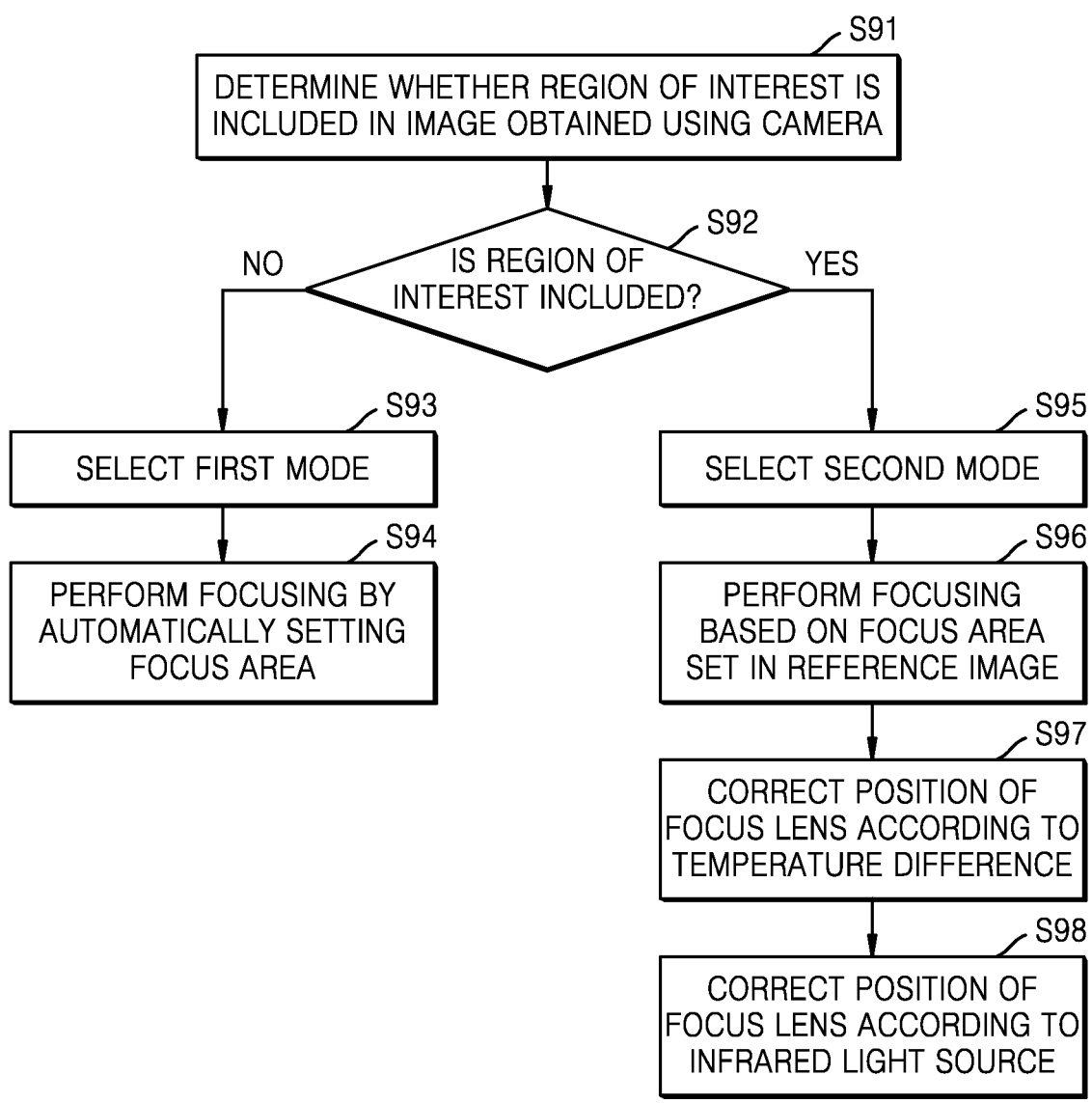
FIG. 11 is a schematic diagram for describing a focusing method of a camera, according to an embodiment.

FIG. 11 is a schematic diagram for describing a focusing method of a camera, according to an embodiment. The embodiment illustrated in FIG. 11 is different from that illustrated in FIG. 10 in that correction of a position of a focus lens considering a light source is further added in the second mode.

While surveillance in a low-illuminance environment at night has become important and as infrared (IR) light-emitting diode (LED) technology is developed, more and more cameras include an IR light source such as an IR projector as an illumination. A focus may vary according to whether infrared light is included in an image signal. Thus, when an image is obtained using infrared light as a light source, a position of a focus lens needs to be corrected.

As illustrated in FIG. 11, in the second mode, the focusing unit 406 may additionally correct a position of the focus lens when an infrared light source is activated (S98). The infrared light source may be included in a camera and covered together using an external housing or may be installed separately apart from a camera in the surroundings. A position correction value of the focus lens with respect to the infrared light source (hereinafter, 'second corrected data') may be previously stored in the storage device 50. When the infrared light source is activated, the focusing unit 406 may further correct a position of the focus lens based on the second corrected data. The focusing unit 406 may output a control signal for correcting a position of the focus lens by the position correction value.

The correction of a lens position by considering temperature difference and the correction of a lens by considering a light source respectively illustrated in FIGS. 10 and 11 may be selectively performed.

According to the present embodiment, the camera may obtain an image on which an object wished (desired) by a user, is focused, equally both during the day or night, in an environment requiring an infrared light source.

The second corrected data may be modified by a user. In an environment in which no infrared light source is installed or an infrared light source is not activated, correction of the position of the focus lens by using the second corrected data may be omitted.

In the embodiments illustrated in FIGS. 9 through 11, the camera 1 may modify a position of the focus lens based on focus position data at the time of zooming in/zooming out in the second mode and perform position correction according to temperature compensation calculated based on the first corrected data and perform position correction according to an infrared light source calculated based on the second corrected data, thereby continuously obtaining an image in which an object wished (desired) by a user is focused.

The auto-focus function has a high probability of failure in a low-illuminance environment with large noise, an environment with a lot of night lighting, and an environment with a considerable amount of movement. For this reason, users use preset and manual focus modes, but problems may arise due to inconvenience of these functions and limitations in the use environment therefor.

In the above-described embodiments, a method of maintaining a focus while a camera performs a PTZ operation and acquires an image in a surveillance area is described. When the PTZ operation of the camera is turned off, the camera may operate in the first mode in which an automatic focusing algorithm is used.

According to the embodiment of the present disclosure, a reference image in which a specific object is focused is generated in advance, and when the reference image occupies a certain ratio or more in an image acquired in real time, or when pan/tilt coordinates of the reference image are included in an image acquired in real time, focusing may be performed quickly by detecting a preset position of a focus lens in a certain object (region of interest) without the need to detect a position of the focus lens according to the stepwise movement of the focus lens. In addition, by previously establishing the position of the focus lens for all zoom magnifications, the position of the focus lens may be moved regardless of a zoom magnification. Accordingly, a state in which a focus is adjusted based on an object desired by the user in real time regardless of a state of an environment and zoom magnifications may be maintained.

In addition, according to the embodiment of the present disclosure, a state may be maintained, in which a focus is adjusted based on an object desired by the user in real time even in an environment with great temperature changes and/or an environment that requires an infrared light source.

In the embodiments of the present disclosure, an additional condition may be set for focusing of the second mode. For example, even when the above-described conditions for conversion to the second mode are satisfied, the focusing apparatus may be converted to the focusing mode of the second mode only when a car or a person is recognized through artificial intelligence (AI). Alternatively, the focusing apparatus may be converted to the focusing mode of the second mode only when an illuminance is lower than or equal to a certain value or higher than or equal to a certain value even when the above-described conditions for conversion to the second mode are satisfied.

The focusing method of a camera according to the embodiments of the present disclosure can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network coupled computer systems so that the computer-readable code is stored and executed in a distributed fashion. Also, functional programs, code, and code segments for accomplishing the present disclosure can be easily construed by programmers skilled in the art to which the present disclosure pertains.

According to the embodiments of the present disclosure, a camera performing a PTZ operation may quickly and accurately perform focusing regardless of a state of an environment.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An operation method of a camera for adjusting a focus on a first image of a surveillance area obtained by performing a pan-tilt-zoom operation, the operation method comprising:
   operating in a first mode related to an automatic setting of a focus area;
   converting from the first mode to a second mode upon determination that a second image corresponding to a region of interest set in the surveillance area is included in the first image at a threshold ratio or more,
   wherein the second mode is a mode that sets the region of interest as the focus area; and
   in the second mode, adjusting focus by moving a focus lens to a predetermined position of the focus lens in the region of interest set as the focus area,
   wherein the operation method performed in the first mode comprises at least one of a first operation, a second operation, or a third operation,
   wherein the first operation is an operation of adjusting focus by moving the focus lens step-by-step to focus on the automatically set focus area,
   wherein the second operation is an operation of tracking a variation in a focus value by moving a position of the focus lens from near to far, and
   wherein the third operation is an operation of adjusting a zoom magnification by zooming in or zooming out a zoom lens.

2. The operation method of claim 1, further comprising:
   in the second mode, focusing the camera on the first image in real time regardless of a state of an environment or the zoom magnification.

3. The operation method of claim 2, wherein the focus area is a reference area for focusing in the first image.

4. The operation method of claim 1, wherein the threshold ratio is 50%.

5. The operation method of claim 1, further comprising:
   in the second mode, correcting the position of the focus lens according to whether an image signal of the first image includes an infrared light.

6. The operation method of claim 5, wherein the position of the focus lens is corrected upon determination that the image signal of the first image includes an infrared light and an infrared light source is activated.

7. The operation method of claim 6, wherein the position of the focus lens is corrected based on a position correction value of the focus lens with respect to the infrared light source.

8. The operation method of claim 1, wherein the step of adjusting focus in the second mode is performed upon determination that a car or a person is recognized in the first image using an artificial intelligence (AI).

9. The operation method of claim 1, wherein the step of adjusting focus in the second mode is performed an illuminance is lower than or equal to a certain value or higher than or equal to the certain value.

10. A focusing apparatus for adjusting a focus on a first image of a surveillance area obtained by performing a pan-tilt-zoom operation, the focusing apparatus comprising:
    a memory for storing an image for a surveillance area; and
    a processor operationally coupled with the memory, the processor configured to:
    operate in a first mode related to an automatic setting of a focus area;
    convert from the first mode to a second mode upon determination that a second image corresponding to a region of interest set in the surveillance area is included in the first image at a threshold ratio or more,
    wherein the second mode is a mode that sets the region of interest as the focus area; and
    in the second mode, adjust focus by moving a focus lens to a predetermined position of the focus lens in the region of interest set as the focus area,
    wherein the processor is configured to perform at least one of a first operation, a second operation, or a third operation in the first mode,
    wherein the first operation is an operation of adjusting focus by moving the focus lens step-by-step to focus on the automatically set focus area,
    wherein the second operation is an operation of tracking a variation in a focus value by moving a position of the focus lens from near to far, and
    wherein the third operation is an operation of adjusting a zoom magnification by zooming in or zooming out a zoom lens.

11. The focusing apparatus of claim 10, wherein the processor is further configured to focus, in the second mode, the camera on the first image in real time regardless of a state of an environment or the zoom magnification.

12. The focusing apparatus of claim 11, wherein the processor is further configured to correct, in the second mode, the position of the focus lens according to whether an image signal of the first image includes an infrared light.

13. The focusing apparatus of claim 12, wherein the position of the focus lens is corrected upon determination that the image signal of the first image includes an infrared light and an infrared light source is activated.

14. The focusing apparatus of claim 13, wherein the position of the focus lens is corrected based on a position correction value of the focus lens with respect to the infrared light source.

15. The focusing apparatus of claim 10, wherein the processor is configured to adjust focus in the second mode upon determination that a car or a person is recognized in the first image using an artificial intelligence (AI).

16. The focusing apparatus of claim 10, wherein the processor is configured to adjust focus in the second mode is performed an illuminance is lower than or equal to a certain value or higher than or equal to the certain value.

* * * * *